May 22, 1923.
L. J. FELLAY
TRACTION WHEEL
Filed Dec. 13, 1919
1,455,869
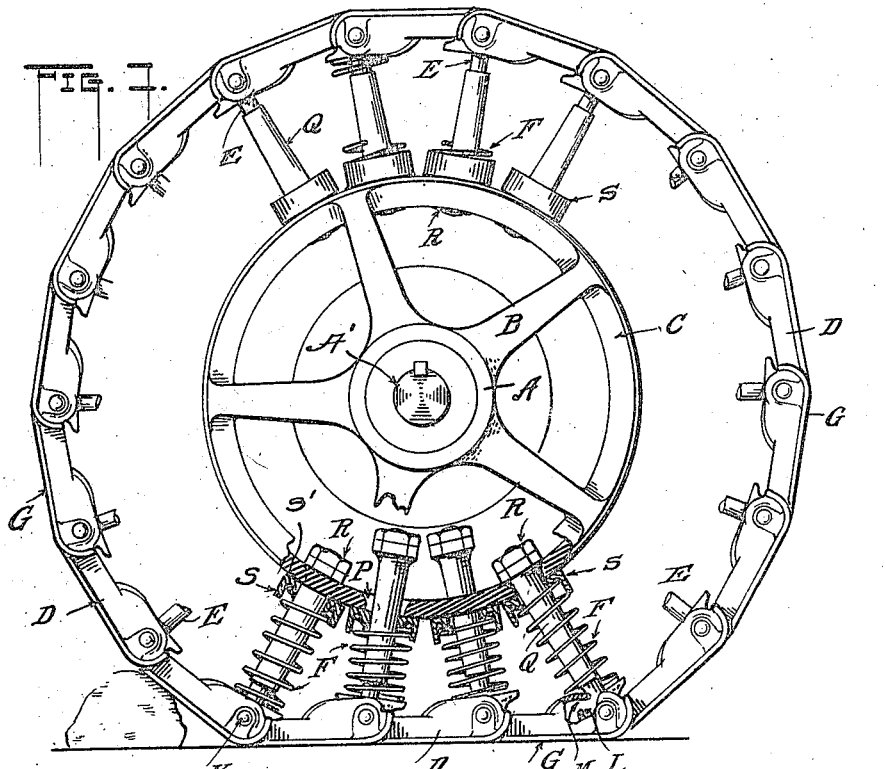
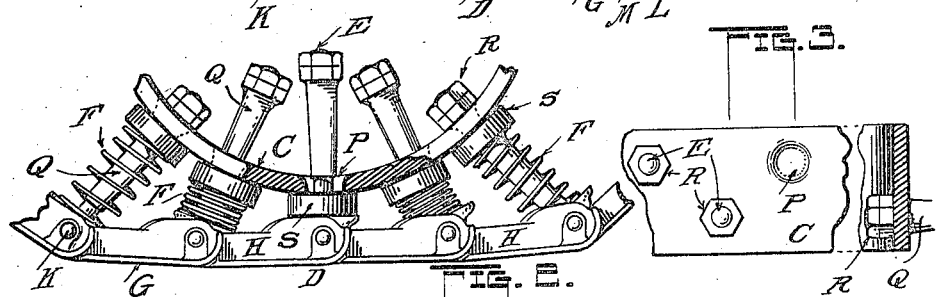
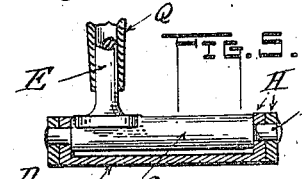
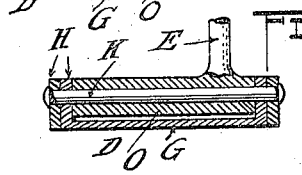
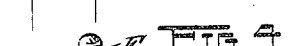
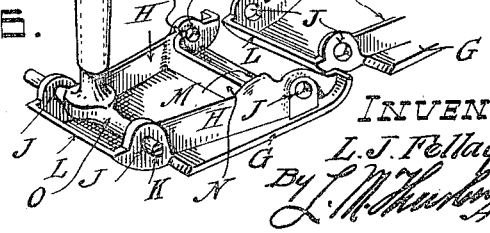

Patented May 22, 1923.

1,455,869

UNITED STATES PATENT OFFICE.

LOUIS J. FELLAY, OF PEORIA, ILLINOIS.

TRACTION WHEEL.

Application filed December 13, 1919. Serial No. 344,673.

*To all whom it may concern:*

Be it known that I, LOUIS J. FELLAY, a citizen of the United States, residing at Peoria, in the county of Peoria and State of Illinois, have invented certain new and useful Improvements in Traction Wheels; and I do hereby declare that the following is a full, clear, and exact description of the invention, which will enable others skilled in the art to which it appertains to make and use the same.

This invention relates to a wheel particularly adapted for tractor purposes. The invention pertains more particularly to a wheel whose rim or tread is made of pivotally connected members several of which are adapted to engage upon the ground at the same time for increasing traction.

One of the objects is to furnish a "flat" tread wheel having a rim or tread made up of pivotally related members wherein the power applied to the hub will be distributed to all of the parts of said wheel.

Another object is to provide a wheel of the type described wherein there will be but a minimum of wear upon its said parts.

In addition, my object is to construct a wheel of the type described that will be staunch and thoroughly dependable, besides being simple in construction.

To the end that the said invention may be understood I have provided the accompanying drawings showing the preferred manner of constructing it.

Figure 1 is an elevation of the wheel showing parts in section.

Figure 2 is a similar view of a portion only of the wheel showing a different position of its tread members.

Figure 3 is a transverse section of a rim portion shown in Figure 1.

Figure 4 shows in perspective one of the members or links of the wheel-rim or tread and a portion of a companion member.

Figure 5 is a transverse section of one of the members, showing certain other parts in connection therewith, and Figure 6 is also a transverse section of the member showing other parts in longitudinal section.

The wheel comprises, first, a hub-portion A to be secured on an axle A′, said hub including integral radiating spokes B and a ring C, and, second, a rim or tread made up of pivotally or hingedly related members or links D, to the joint of each of which is pivoted a spoke indicated as a whole by E, having a certain relation to the said ring C, and including supporting springs F.

More specifically the construction of the said rim or tread and related parts is as follows:

Each of the said links D comprises a tread-portion G and pairs of rib portions H extending from the inner surfaces of said links spaced so as to lie near the outer edge of said tread portions. At each end the ribs are provided with holes J to take a hinge-pin K, Figure 4. It is observed in the figures referred to that the said ribs diverge toward one end of the link so as to receive between them the narrow end of an adjacent link, the said hinge-pins K serving to hold the two in connected pivotal relation. Further, it is to be observed that the link at its narrow end is provided with a flange L extending away from its inner surface which engages beneath a hooked portion M on each rib at the flared ends, the hooks extending from a wall portion N. The purpose of the portion N and the hooks M will be described later.

Each of the described hinge-pins K passes through and supports a sleeve O of a spoke E, as clearly shown in Figure 6, the sleeve and spoke being a unitary structure. The ring C is provided with a series of holes P, one of which lies opposite each hinge-pin and its spoke E, and each hole is preferably countersunk at the inner surface of said ring as clearly shown in Figure 1.

The holes are placed in staggered relation, as indicated in Figure 3, to correspond with the staggered relation of said spokes E. That is to say, certain of the spokes E are near one end of the sleeves O of which they are parts, as stated, while the alternate ones are near the other ends of the remaining sleeves. Or, to state it another way, the sleeves are so placed upon the pins K that the spokes alternate in position to obtain the staggered relation.

Each spoke E is threaded and receives upon it a sleeve Q internally threaded to correspond therewith, a lock-nut R also being used to fix the sleeve in a desired adjustment. All of the sleeves are of a tapered form and are adapted to work within the countersunk holes P, their inner ends having a flared form to snugly seat in the same.

S indicates a sleeve carried by each of the sleeves Q, the same having an annular recess S' in its side facing the tread made up of the links D.

Each of the described springs F is compressed between the sleeve O and the said sleeve S, lying at one end in the said annular recess S' of the latter, each said spring serving to throw outward the joints of any two links D keeping the wheel tread distended to substantially its fullest extent except, of course, at that portion thereof which rests upon the ground which will be more or less flattened due to the weight resting upon it through the axle A', the sleeves being necessarily unseated as shown in Figure 1.

Depending upon the weight imposed upon the said axle A' and the strength of the springs to support that weight the wheel-tread will be more or less flat as is clear That is to say, in Figure 1 the springs are only partially compressed by the ring C forcing the sleeves S downward onto said springs, supporting the weight of the vehicle when of the lighter form such as a truck for example, there being say three links in contact with the ground.

When the vehicle is a tractor, however, if the same strength of spring is used the springs will be still more compressed or to the extent that the sleeves S may lie upon the sleeves O, if the recesses S' are deep enough to receive the springs, otherwise the said sleeves S will rest upon said springs, there then being, say four links in contact with the ground.

When driving power is applied to the axle A' such power is transmitted to the ring C which in turn is transmitted to the rim made up of the links D through the spokes E and sleeves Q.

All of the sleeves Q can be screwed down upon their spokes E toward the ring C, shortening the distance between their heads and the sleeves O at the hinge pins K. This drawing up of the spokes tends to bring the said hinge-pins toward the center of rotation and, depending upon the extent to which the sleeves are screwed down, the wheel rim will be made more or less inflexible. If the sleeves Q are drawn up snugly all of them will be seated in the ring and the latter and the rim will be practically concentric.

It must be clear that if all the sleeves are seated firmly in the ring, having drawn the hinge-pins K as far as possible toward the wheel-center the links D will in effect be fixed relatively to the ring C and the rim will therefore be rigid throughout with but slight yielding inwardly at the ground. On the other hand when the sleeves are "backed away" from the rim the opposite result is obtained.

The extensions L of the links, Figure 4, lie beneath the hooks M when said links are assembled. Also, the beveled edge of the tread portion G of one link shown at the right of figure 4 lies close beneath the tread portion of the next link so that when the wheel passes over a stone or other obstruction the movement of the links relatively and in the direction of the center of rotation will be limited by these parts, said parts in no way limiting the pivotal movement of said links on one another in the other direction.

I claim:

1. In a wheel, a rim or tread therefor including in its construction a series of jointed links, an annulus fixed with respect to the wheel hub, and a series of spokes each hingedly mounted at one end at the joint of each pair of the links and projecting at its other end through said annulus, the latter having countersunk holes therein, the spokes being flared to seat therein, the flared portions being adjustable upon the spokes, and compression springs interposed between the links and the annulus.

2. In a wheel having a rim or tread consisting of hingedly related links, an annulus fixed with respect to the wheel-hub having a series of countersunk holes therein, a spoke pivoted at one end to the connected ends of each pair of links and extending at its other end through one of the holes of the annulus, a sleeve threaded upon each spoke and adjustable longitudinally thereof having a head corresponding to said countersunk hole, means to lock the sleeve with respect to the spoke, and springs interposed between the annulus and said rim or tread.

3. A wheel including in its construction a rim or tread made up of a series of links, a hinge-pin forming the pivotal connection for each, an annulus spaced inward from the rim or tread including a series of countersunk holes each lying opposite one of the places of connection of the links, and a spoke erected upon each hinge-pin and each extending through one of the said countersunk holes of the annulus, a sleeve threaded on each spoke having a head fashioned to seat in its respective hole, means to separately secure each sleeve with respect to its spoke, and springs interposed between the annulus and the links.

4. The combination in a wheel, of a rim or tread made up of a series of links, an end of each being received into the end of an adjacent one, and a pin extending through both constituting a pivot therefor, the links at their ends having abutting portions adapted to engage one another to limit the movement of the links with respect to one another inwardly toward the center of rotation of said wheel.

In testimony whereof I affix my signature in presence of two witnesses.

LOUIS J. FELLAY.

Witnesses:
V. V. CARLEY,
L. M. THURLOW.